Patented Sept. 30, 1941

2,257,162

UNITED STATES PATENT OFFICE 2,257,162

PRODUCTION OF RESINS FROM ALKYLENE-IMINE WITH ARYLISOCYANATES

Paul Esselmann, Wolfen, and Josef Düsing, Dessau, Germany, assignors, by mesne assignments, to Walther H. Duisberg, New York, N. Y.

No Drawing. Application August 4, 1938, Serial No. 223,011. In Germany August 4, 1937

1 Claim. (Cl. 260—2)

Our present invention relates to the production of a new type of artificial resins.

In "Berichte" 28 (1895), pages 2935 to 2936, Gabriel and Stelzner describe the reaction of vinylamine on phenylthiocyanate and phenylcyanate. The reaction described produces monomeric products which are identified as vinylphenylthiourea and vinylphenylurea. The production of nitrogen-containing resins which are stable against acids and alkalies is not disclosed in the publication.

It is an object of our present invention to provide a new type of artificial resin which is stable against the action of dilute acids and dilute alkalies.

A further object is the provision of artificial resins having a distinct basic character owing to their content of basic nitrogen.

A further object is the provision of resins which are insoluble in water and the usual organic solvents.

A further object of the invention is the provision of a process of polymerizing an alkyleneimine together with an aromatic isocyanate or isothiocyanate.

A still further object resides in the provision of resins of exceedingly high melting point.

Still another object is the provision of resins which can be easily dyed by the usual acid wool dyestuffs and which, if incorporated in a spinning solution of an organic fiber-forming polymer, lends to the fibers derived from said spinning solution the property of being easily dyed by acid wool dyestuffs.

A further object of the invention is the provision of artificial resins, which may be employed for the production of films, foils, ribbons, bristles, artificial horsehair, fibers, threads, filaments and the like shaped bodies.

Still further objects of our invention will become apparent as the following detailed specification proceeds.

We have found that synthetic resins stable against alkalies and acids may be obtained if ethyleneimine or a polymer or homologue thereof is caused to polymerize together with an aromatic isocyanate or isothiocyanate.

Suitable aromatic isocyanates and isothiocyanates are, for instance, phenyl isocyanate, phenyl isothiocyanate, benzylisocyanate and substituted products.

Suitable alkyleneimines are, for example, ethyleneimine, propyleneimine, N-propylethyleneimine, N-benzyl-ethyleneimine, butyleneimine and similar products. For the production of the resins according to the invention the polymers of these alkyleneimines may also be employed.

It is advantageous to conduct the polymerization at a raised temperature. The reaction should preferably occur in solution. As solvents for ethyleneimine, water, alcohols, and solvents not containing hydroxyl-groups may be used. There are obtained resins which are thoroughly stable against acids and alkalies, contain about 15 to 20 per cent of nitrogen and dissolve only in aniline or alcohols of high boiling point.

The polymerization of the reactants can be obtained by adding suitable acid or alkaline polymerization catalysts. The selection of these catalysts does not form part of the invention, since they are well known in the art.

If catalysts are used at all, it is generally unnecessary to raise the temperature of the reaction mixture beforehand, since the polymerization proceeds with considerable development of surplus heat.

As an example ½ mol of phenyl-isocyanate may be added drop by drop to an aqueous ethyleneimine solution of 50 per cent strength. The temperature is allowed to rise to 40° C. and is kept as far as possible at this limit. After addition of the phenylisocyanate the mixture must be stirred strongly and then allowed to stand. After some hours further polymerization occurs whereby temperatures above 200° C. may be attained.

The polymerization products may be purified by boiling with sulfuric acid of 10 per cent strength and water. The reaction of aqueous ethyleneimine with aromatic isocyanates or isothiocyanates has the disadvantage that one part of the cyanate reacts with the water whereby the yield of pure polymerizate is reduced. Therefore, it is more advantageous to use an alcohol or a solvent free from hydroxyl instead of water, for instance benzene, aniline, or a hydrocarbon having reactive halogen, such as trichlorethylene. The last named has proved especially suitable, since trichlorethylene forms an addition product with ethyleneimine which essentially accelerates the polymerization.

It is sometimes advantageous to carry out the polymerization in the presence of an aromatic amine. The resins produced in this manner usually have a high melting point. They are also inexpensive, as the cheap aniline or the like may partly replace the alkyleneimine.

The following examples further illustrate the invention:

*Example 1.*—5 kilos of phenylisocyanate are added gradually by drops to an aqueous solution of 50 per cent strength of ethyleneimine (0.5 kilo). There is at first formed a white emulsion which gradually becomes thicker so that finally the whole has solidified to a white insoluble mass. The cake thus formed is pressed to remove the adhering solution and after comminution they are heated for 15 minutes with a sulfuric acid of 10 per cent strength at 70° C. and finally thoroughly extracted with boiling water. The resinous product is completely insoluble in dilute acids and alkalies.

Example 2.—500 cc. of a solution of 80 per cent strength of ethyleneimine are diluted with 2.5 liters of methanol. To this alcoholic solution, under the conditions recited in Example 1, there are added 1.1 kilo of phenylisocyanate. The product obtained contains 16 per cent of nitrogen. It is completely insoluble in dilute acids and alkalies.

Example 3.—1 liter of ethyleneimine of 100 per cent strength is diluted with 1 liter of benzene and 1 liter of trichlorethylene. While cooling 2.5 liters of phenylisocyanate are added gradually to this mixture in a reflux apparatus. It is important that the temperature should not rise above 40° C. during this operation. As soon as a sudden rise of temperature is observed, the addition of phenylisocyanate must be interrupted. During the whole reaction slow stirring is maintained. The honey-yellow thick solution is allowed to stand for 24 hours while cooling, during which time a further polymerization and a further reaction occur. At higher temperatures the viscous solution becomes a resinous product having the appearance of amber and contrary to the viscous masses first obtained is no longer soluble in benzene, but soluble only in cyclohexanol and aniline.

Example 4.—1190 grams of phenylisocyanate are diluted with 1190 grams of trichlorethylene. To this solution there are added by drops and with slow stirring 530 cc. of ethyleneimine of 80 per cent strength, care being taken that the temperature does not rise above 40° C. As soon as the reaction is finished, the whole is allowed to stand for some hours and is then heated on the steam bath for 4 hours. A glassy white polymerization product is obtained, which contains 11.72 per cent of nitrogen and is insoluble in dilute acids and alkalies.

Example 5.—To 100 cc. of ethyleneimine solution of 98.5 per cent strength are added 100 cc. of trichlorethylene and 100 cc. of benzene. While stirring under a reflux there are added 180 cc. of phenylisothiocyanate gradually by drops. The temperature is not to be allowed to rise above 40° C. during the addition of the thiocyanate. The highly viscous white emulsion thus obtained is heated for a short time at 60° C. and then becomes completely clear. From this colorless solution resinous products are easily obtained if after the reaction the polymerization is carried further by a rise in temperature.

Example 6.—500 cc. of phenylisocyanate purified by distillation are added gradually to a mixture of 500 cc. of ethyleneimine of 98 per cent strength with 1 liter of benzene. The solution thus obtained is as clear as water. The solution is caused to further react by letting it stand at room temperature for several days. The viscosity of the solution increases every day. After 4 days the polymerization has proceeded so far that the solvent separates and the product is no longer soluble in benzene. The benzene is removed and a residue consisting of a clear and transparent, viscous mass remains. This residue may be drawn out into fine threads. The polymerization product is completely insoluble in dilute acids or caustics and has an extremely good affinity for acid wool dyestuffs.

It is possible to again react the viscous solution with another ½ mol of phenylisocyanate. An orange colored resin is obtained which melts at 112° C. and is soluble in hot cyclohexanol.

Example 7.—Ethyleneimine in an aqueous solution of 30 per cent strength is polymerized by introduction of carbonic acid into the solution. 1 mol of phenylisocyanate is added to this viscous liquid in drops. A white powdery mass is obtained which melts at 215° C. and yields a brown resin. The product contains 16.8 per cent of nitrogen. It is soluble in pyridine, cyclohexanol, cyclohexanone, butylglycol, and ethylenechlorhydrin. It is, however, insoluble in dilute acids and alkalies.

Example 8.—1 mol of phenylisocyanate is added cautiously in drops to 1 mol N-benzyl-ethyleneimine, whereby a marked increase in temperature occurs. By letting the reaction mixture stand overnight the whole polymerizes and yields a yellow glassy resin, which melts at 45° C. and then again solidifies. The melted resin becomes glassy brown on cooling. The melting point of the final condensation product is 185° C.

Example 9.—100 cc. ethyleneimine of 98 per cent strength are dissolved in 100 cc. of benzene and 100 cc. of aniline and caused to react with 200 cc. of freshly distilled phenylisocyanate at 40 to 45° C. The addition of phenylisocyanate should last two hours. The crystals obtained are filtered off and melted. They solidify and yield a white resinous mass. This latter resin has an extremely high melting point, since it only starts getting brown above 200° C. without melting.

Example 10.—100 cc. of ethyleneimine of 98 per cent strength are diluted with 100 cc. of benzene and 100 cc. of trichlorethylene. 275 cc. of phenylisocyanate are added to this solution. The addition should occur gradually at a temperature not exceeding 45° C. The whole is allowed to react for 4 hours at 60 to 70° C. on the steam bath. The resultant viscous solution reacts with 100 cc. of aniline with considerable development of heat, whereby a hard, firm mass is obtained which can only partly be dissolved in higher alcohols and pyridine. The product is dissolved clearly by cyclohexanol at raised temperature. On cooling a white milky turbidity is obtained. The melted product constitutes a light-brown, transparent, glassy resin.

Example 11.—93 grams of aniline are mixed with 45 grams of ethyleneimine (98 per cent strength) and 200 grams of benzene. 238 grams of phenylisocyanate are allowed to drip into this solution at 10° C. The product obtained is melted. The resin thus produced is yellow and transparent; in the melted state it is capable of being drawn out into fibers.

Example 12.—100 grams of ethyleneimine (98 per cent strength) are dissolved in 200 cc. of benzene and 120 cc. of phenylisocyanate (½ mol) are added in drops at 10° C. After about 100 cc. phenylisocyanate have been added the reaction mixture begins to solidify and is mixed with 100 cc. of glacial acetic acid while cooling strongly. After about 20 cc. of acetic acid have been added the temperature rises suddenly from 5 to 70° C. (temperature of polymerization). By the further addition of the glacial acetic acid the whole gradually coagulates and forms a viscous mass. The resin thus produced is insoluble in benzene. It is, however, dissolved by hot cyclohexanol.

*Example 13.*—100 cc. of ethyleneimine of 98 per cent strength in 200 cc. of benzene are mixed with 120 cc. of phenylisocyanate; after standing for two hours 25 cc. of ethylsulfonic acid are added, whereat the temperature rises to 70° C. When the product has cooled it is again heated to the melting point and a resinous white mass is obtained.

*Example 14.*—100 cc. of ethyleneimine of 98 per cent strength are dissolved in 200 cc. of benzene and mixed with 120 cc. of phenylisocyanate at 5° C. Care has to be taken that the temperature does not exceed 10° C. To the reaction mixture there are gradually added 100 cc. of lactic acid, whereat the temperature suddenly rises to 60° C. The resin formed by the heat of the polymerization is insoluble in benzene, but soluble in cyclohexanol.

*Example 15.*—100 cc. of ethyleneimine dissolved in 200 cc. of benzene are reacted with 240 cc. of phenylisocyanate at 5° C. After 160 cc. phenylisocyanate have been added the mixture is again diluted with 200 cc. of benzene and then the rest of phenylisocyanate is added. 100 cc. of lactic acid are slowly added to the thick paste, whereat it dissolves with a considerable development of heat. By the acid polymerization the resinous product has become insoluble in benzene and two layers are formed which are separated by decanting.

*Example 16.*—To a solution of 100 cc. ethyleneimine in 200 cc. of benzene 260 cc. benzylisocyanate are added in drops. The temperature during the addition of the benzylisocyanate should be about 40° C. The reaction mixture is left to stand overnight. A yellow viscous solution results. ½ of the solution is allowed to polymerize further at ordinary temperature for several days, whereafter the yellow condensation product becomes insoluble in benzene. The rest of the solution is mixed with 50 cc. of lactic acid, whereat polymerization sets in and the solution is decolorized.

*Example 17.*—100 cc. of ethyleneimine are dissolved in 100 cc. of benzene and mixed with 230 cc. of cyclohexanone. The temperature rises by about 50° C. The long needles obtained are dissolved by heating on the water bath. To this solution there are gradually added 200 cc. of phenylisocyanate purified by distillation. The addition of the phenylisocyanate should be extended over 6 hours. After the end of the reaction the whole is again heated on the steam bath for 8 hours. The brown resin obtained is perfectly insoluble in acids and caustics and may be easily dyed with acid wool dyes.

*Example 18.*—To a solution of 100 cc. ethyleneimine in 100 cc. benzene there are cautiously added 200 cc. recently distilled phenylisocyanate (temperature during the addition 40 to 45° C.). The time of reaction is about 4 hours. 50 cc. of ethyl alcohol are added to this solution; the reaction product represents a clear, transparent solution. After addition of 5 cc. of glacial acetic acid the mixture is heated on the steam bath, whereat the temperature rises up to 120° C. The highly viscous resin is colored red to orange.

*Example 19.*—1 mol of ethyleneimine polymerized by means of carbonic acid, which is diluted with 50 cc. of benzene is mixed while slowly stirring with 1 mol of freshly distilled phenylisothiocyanate at 40 to 45° C. The length of time of the addition of phenylisothiocyanate should be 8 hours. After the end of the reaction the reaction mixture is heated for 10 hours on the steam bath. The reddish-brown resin is dissolved by cyclohexanone and ethylenechlorhydrin. Instead of phenylisothiocyanate phenylisocyanate may be used with the same result.

*Example 20.*—100 cc. of alcohol and 100 cc. of benzene are added to 120 cc. of 1.3-propyleneimine. 235 cc. of purified phenylisocyanate are added slowly while stirring to this mixture. During the addition the temperature should if possible be kept at 30° C. The orange-red reaction mixture is left to stand at 32° C. for two days and then 50 cc. of pure lactic acid are added in portions. The temperature rises up to 70° C. After 4 hours another 60 cc. of lactic acid are added until the mixture has lost its red color and is only slightly yellow in color. After another 24 hours the solution has become still more viscous. Finally 20 cc. of cyclohexanol are added. The finished condensation product is a clear, slightly yellow highly viscous solution. By evaporating the solvent on the water bath it is possible to obtain a beautiful transparent resin.

*Example 21.*—200 cc. distilled phenylisocyanate and 100 cc. of alcohol are added in drops to a mixture of 100 cc. butyleneimine and 50 cc. of benzene. Care is taken that the temperature is between 40 and 45° C. during the addition. After it has stood overnight the reaction product is cautiously mixed with 25 grams of chloracetyl chloride. Reaction occurs rapidly. After the product has stood for another 24 hours 20 grams of lactic acid are added and the mixture is allowed to polymerize further for another three days.

What we claim is:

Process for the production of resins, stable against alkalis and acids which comprises the addition of an alkylene imine at a temperature not exceeding 45° C. to a compound selected from the class consisting of arylisocyanates and arylisothiocyanates, in such a manner that one component is added to the other drop by drop, while said other component is dissolved in trichlorethylene and further condensing the resulting product by heating it up to 120° C., until it has become insoluble in acids and alkalis.

PAUL ESSELMANN.
JOSEF DÜSING.